United States Patent Office 3,093,437
Patented June 11, 1963

3,093,437
PROCESS FOR THE DYEING, PADDING AND PRINTING OF HYDROPHOBIC FIBERS WITH INDANDIONE DYESTUFFS
Ernest Merian, Bottmingen, and Otto Senn, Arlesheim, Basel-Land, Switzerland, assignors to Sandoz Ltd., Basel, Switzerland
No Drawing. Filed Feb. 16, 1960, Ser. No. 8,908
Claims priority, application Switzerland Apr. 25, 1958
12 Claims. (Cl. 8—21)

The present invention is a continuation-in-part application of our co-pending application Ser. No. 804,093, filed April 6, 1959 (now abandoned).

This invention relates to a process for the dyeing, padding and printing of hydrophobic fibers, e.g. secondary cellulose acetate and cellulose triacetate, synthetic polyamide fibers and, in particular, polyester fibers, the said process consisting in the use of disperse dyestuffs which are obtained by coupling 1 mole of the diazo compound of a 1-amino-nitrobenzene, which may contain a non-water-solubilizing substituent in the 4 position, with 1 mole of 1.3-indandione (1.3-diketohydrindene) or with 1 mole of a derivative of the same containing a non-water-solubilizing substituent in the phenylene nucleus.

The term polyester fibers refers more especially to the condensation products of terephthalic acid and ethylene glycol which are marketed under the registered trade names "Terylene," "Dacron," "Tergal," "Terital," "Trevira" and "Diolen."

The yellow and orange shades which are obtained on polyester fibers by dyeing, padding and printing techniques possess good fastness to light, sublimation and heat setting, and very good fastness to washing and perspiration. Wool, cotton and viscose rayon in blended fabrics are well reserved. This property has assumed great importance with the growing popularity of blends of polyester fibers with other fibers, notably wool.

When polyester fiber-wool blends are dyed with disperse dye-stuffs a substantial amount of the dyestuff is absorbed and retained by the wool; such wool dyeings are not fast and consequently the commercial value of the goods is reduced. There are no yellow disperse dyestuffs commercially available which give a sufficiently good reserve of wool. The indandione dye-stuffs of the present invention are superior to all the known commercial dyestuffs in this respect.

The dyeings, paddings and printings on secondary acetate and triacetate have practically the same shade as the dyeings on polyester fibers and possess good fastness to gas fumes and pleating and good dischargeability.

The dyeings, paddings and printings on synthetic polyamide fibers (Nylon 66, "Perlon," "Mirlon," "Grilon" and "Rilsan," registered trademarks) have good to very good washing fastness.

Diazo compounds coming within the scope of the above definition are derivable from, e.g., 1-amino-2-nitrobenzene, 1-amino-2,4-dinitrobenzene, 1-amino-2-nitro-4-chlorobenzene, 1-amino-2-nitro - 4 - methylbenzene, 1-amino-2-nitro - 4 - acetylaminobenzene, and from the 1-amino-2-nitro-4-carbalkoxy, -carbocycloalkoxy-, -carbaralkoxy- or -carbaryloxyaminobenzenes which may be substituted in the urethane radical.

Examples of suitable coupling compounds, besides 1.3-indandione itself, are mononitro-, monobromo- or monochloro-1.3-indandione and 5.6-dibromo- or 5.6-dichloro-1.3-indandione, also 2-substituted indandiones whose radical in the 2 position can be exchanged for an ortho-nitro-phenylazo radical, e.g. 1.3-indandione-2-carboxylic acid and its alkyl esters.

In the following description the products are termed briefly "indandione dystuffs." Members of this group of dyestuffs which are especially suitable for the present process are listed in the table below. Column (I) gives the radical R of the amines of formula

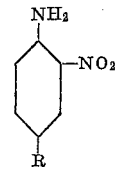

which are used in the production of the diazo compounds, column (II) the coupling components, and column (III) the shades of the dyeings on "Dacron" (registered trademark). The dyestuffs in which R represents a urethane radical have not been described hitherto. Their preparation is described in Examples A to D.

TABLE

| Dyestuff | (I) | (II) | (III) |
|---|---|---|---|
| 1 | Cl | 1.3-indandione | yellow. |
| 2 | Cl | 5.6-dichloro-1.3-indandione | Do. |
| 3 | H | 1.3-indandione | Do. |
| 4 | CH₃ | do | Do. |
| 5 | carbophenoxyamino | do | reddish yellow. |
| 6 | carbethoxy-amino | do | yellow. |
| 7 | do | 1.3-indandione-2-carboxylic acid-ethyl ester. | |
| 8 | do | 5.6-dichloro-1.3-indandione-2-carboxylic acid ethyl ester. | Do. |
| 9 | do | monochloro-1.3-indandione. | Do. |
| 10 | carbomethoxyamino | 1.3-indandione | Do. |
| 11 | carbo-n-propoxyamino | do | Do. |
| 12 | carbo-n-butoxyamino | do | Do. |
| 13 | carbo-(2'-ethoxy)-ethoxyamino. | do | Do. |
| 14 | carbo-(3'-methoxy)-propoxyamino. | do | Do. |
| 15 | carbo-(3'-methoxy)-butoxyamino. | do | Do. |
| 16 | carbo-(4'-methyl)-phenoxyamino. | do | Do. |
| 17 | carbo-(4'-methoxy)-phenoxyamino. | do | Do. |
| 18 | carbo-benzyloxyamino | do | Do. |
| 19 | carbocyclohexyl-oxy-amino. | do | Do. |
| 20 | carbo-2'-[(2''-methoxy)-ethoxy]-ethoxyamino. | do | Do. |
| 21 | carbo-2'-[(2''-butoxy)-ethoxy]-ethoxyamino. | do | Do. |
| 22 | carbo-(2'-methyl)-phenoxyamino. | do | Do. |
| 23 | carbo-(2'phenoxy)-ethoxyamino. | do | Do. |
| 24 | carbo-(4'-methoxy)-butoxyamino. | do | Do. |
| 25 | carbo-isobutoxyamino | do | Do. |
| 26 | carbo-tert. butoxyamino | do | Do. |
| 27 | carbo-isoamyloxyamino | do | Do. |
| 28 | carbo-tert. amyloxy-amino. | do | Do. |
| 29 | carbo-n-amyloxyamino | do | Do. |
| 30 | carbo-isopropoxyamino | do | Do. |
| 31 | carbo-2'-[(2''-ethoxy)-ethoxy]-ethoxyamino. | do | Do. |
| 32 | carbo-(2'-ethoxy)-phenoxyamino. | do | Do. |
| 33 | carbo-(2'-methoxy)-ethoxyamino. | do | Do. |
| 34 | carbethoxyamino | monobromo-1.3-indandione. | Do. |
| 35 | do | 5.6-dibromo-1.3-indandione. | Do. |
| 36 | do | mononitro-1.3-indandione. | Do. |
| 37 | carbo-sec. butoxyamino | 1.3-indandione | Do. |
| 38 | carbo-pentyl-3-oxyamino. | do | Do. |
| 39 | carbo-pentyl-2-oxyamino. | do | Do. |
| 40 | carbo-phenylethoxy-amino. | do | Do. |
| 41 | carbo-(4'-methyl)-cyclohexyloxyamino. | do | Do. |
| 42 | nitro | do | Do. |
| 43 | acetylamino | do | Do. |
| 44 | propionylamino | do | Do. |
| 45 | butyrylamino | do | Do. |
| 46 | ethyl | do | Do. |
| 47 | isopropyl | do | Do. |

The indandione dyestuffs are converted into a finely divided form by dissolving them in a water-miscible solvent, if necessary at elevated temperature, and running the resulting solution into water, upon which the product is filtered off, washed, and kneaded with a dispersing agent. In this way a paste is obtained which can be subsequently dried at normal or reduced pressure or in spray driers. An alternative procedure for bringing the dyestuffs into a finely divided form is to reduce them to the desired particle size by grinding in the dry or the moist state in grinding and/or kneading machines in presence of dispersing agents and, if necessary, fillers and/or grinding assistants; this can be followed by drying by one of the drying processes employed in pigment production. The resulting dyeing preparations contain the indandione dystuffs in particles of the order of magnitude of $1\mu$.

In certain instances the affinity of the preparations can be further improved by mixing two or more of the dyestuffs, after conversion into the finely divided state.

Polyester fibers are dyed by the known methods in presence of carriers at 80–100° C. or in absence of carriers with pressure at 100–140° C.

Cellulose ester fibers are advantageously dyed at temperatures from 80° to 90° (acetate) or from 90° to 100° C. (triacetate). When the dyeing is carried out at temperatures higher than 100° C. under pressure, whereby the dyeing time can appreciably be reduced, care is to be taken, that the dyebath has a neutral reaction in order to avoid saponification of the acetate groupings.

Synthetic polyamide fibers are advantageously dyed at a temperature near 100° C. or at a temperature above 100° C. under pressure.

In all these dyeing processes additions of dispersing agents, such as soap, the dry residue of sulfite waste liquor, sodium dinaphthylmethanedisulfonate, Turkey red oil, sodium cetyl sulfate, sodium oleoyloxyethanesulfonate, sodium oleoylaminoethanesulfonate or the condensation products of fatty alcohols or alkylphenols with ethylene oxide, have a beneficial effect.

Application by printing and padding techniques is best carried out in presence of thickening agents and is followed by fixation at high temperatures without steam, e.g. at temperatures between 90° and 200° C., or with steam, preferably at temperatures ranging from 100° to 150° C.

Suitable thickening agents for the printing processes are alkali metal alginates, tragacanth, locust bean meal, carboxymethylcellulose, but especially gums, such as Senegal, Arabic, British and in particular crystal gum, while the alkali metal alginates are best suited for the padding processes.

This invention relates also to new indandione dyestuffs of the formula

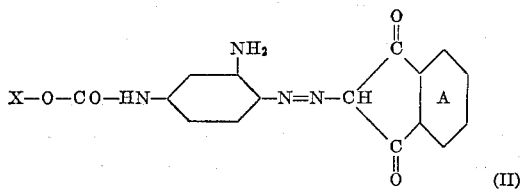

(II)

wherein X stands for an alkyl, cycloalkyl, aralkyl or aryl radical which may contain non-water-solubilizing substituents, and the nucleus A may contain non-water-solubilizing substituents.

The process for the production of the new indandione dyestuffs consists in coupling 1 mole of the diazo compound of an amine of the formula

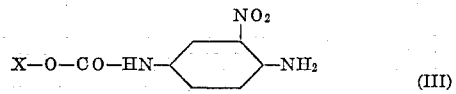

(III)

wherein X possesses the aforecited meaning, with 1 mole of a 1.3-indandione which may contain none-water-solubilizing substituents in the phenylene nucleus or with a compound which is converted into a 1.3-indandione under the operating conditions of the process.

The coupling reaction is effected in an acid, neutral or alkaline medium at low temperatures, e.g. —5° to 15° C.

Diazo components which merit special mention are the amines of Formula III in which X may represent, e.g., methyl, ethyl, n-propyl, iso-propyl, n-butyl, iso-butyl, sec. butyl, tert. butyl, n-amyl, iso-amyl, tert. amyl, 2'-ethoxy- or 2'-methoxyethyl, 3'-methoxypropyl, 3'- or 4'-methoxybutyl, 2' - (2" - methoxy)-ethoxyethyl, 2'-(2"-ethoxy)-ethoxyethyl, 2'-(2"-n-butoxy)-ethoxyethyl, 2'-phenoxyethyl, phenyl, 2'-, 3'- or 4'-methyl-, -methoxy- or -ethoxyphenyl, benzyl, phenylethyl, cyclohexyl or methylcyclohexyl.

Examples of suitable coupling components are listed in column 2, of the present specification.

A variant of the press consists in reacting an aminomonoazo compound of the formula

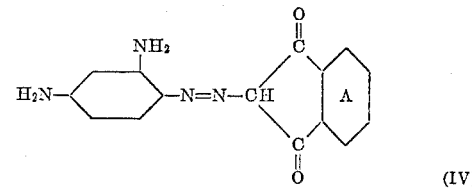

(IV)

wherein the nucleus A may contain non-water-solubilizing substituents, with an alkyl, cycloalkyl, aralkyl, or aryl ester of chloroformic acid which may contain non-water-solubilizing substituents.

The reaction of the aminomonoazo compound of Formula IV with the chloroformic acid ester is conducted preferably in solution (e.g. in an inert organic solvent) or in a very fine aqueous suspension, preferably in presence of a proton acceptor. Depending upon the mode of operation, the temperature of the reaction may vary within wide limits.

The chloroformic acid esters correspond to the formula

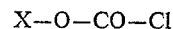

wherein X has the same meaning as it has in the diazo components used in the coupling reaction.

In the following examples the parts and percentages are by weight and the temperatures are in degrees centigrade.

*Example 1*

3 parts of a dyeing preparation of Dyestuff 1 of the table are pasted with a little cold, soft water. More cold, soft water is poured into the paste, and the resulting suspension is stirred well and added through a sieve to a dyebath consisting of 2 parts of sodium lauryl sulfate and 4000 parts of water.

100 parts of a fabric of "Dacron" (registered trademark) polyester fiber are brought into the dyebath at 40–50°. The temperature is slowly increased to 95–100° and the material dyed for 1 to 2 hours at this temperature in presence of 20 parts of an emulsion of a chlorinated benzene in water.

The yellow dyeing obtained is rinsed, soaped, rinsed again and dried. It is fast to sublimation and heat-setting, has good fastness to light, cross-dyeing, washing, water, sea water, perspiration and gas fumes, and is white dischargeable. Wool present in the dyebath is reserved. The other Dyestuffs 2 to 47 of the table can be applied in a similar way.

The dyeing preparation is produced by grinding 1 part of Dyestuff 1 with 1 part of sodium dinaphthylmethanedisulfonate and 8 parts of water in a ball mill for 70 hours, and drying the resulting paste in a spray drier.

The chlorinated benzene employed in this example can be replaced by an equivalent amount of a hydroxy-diphenyl or a salicylic acid ester or a mixture of terephthalic acid dimethyl ester, benzanilide and sodium sulfate.

*Example 2*

The dyebath is prepared as described in the first paragraph of Example 1. 100 parts of a scoured fabric of "Terylene" (registered trademark) polyester fiber are introduced into the bath at 40–50°, the temperature slowly increased to 120–130° and dyeing continued at this temperature for about 30 minutes under static pressure. The dyed goods are rinsed, soaped, rinsed and dried; the dyeing is fast to sublimation and heat-setting processes.

With the other dyestuffs of the table similar results are obtained.

*Example 3*

10 parts of the Dyestuff 6 of the table in the form of the moist, undried filter presscake, 10 parts of Turkey red oil and sufficient water to give a total of 200 parts are mixed for 2 hours to form a paste, 5 parts of which are added to 2000 parts of water and 5 parts of 2-hydroxy-1.1'-diphenyl. In this dyebath 100 parts of "Tergal" (registered trademark) polyester fiber are entered at 40–50°, dyed for 1 hour at the boil and rinsed. A yellow, well penetrated dyeing with good fastness properties is obtained. The other dyestuffs of the table can be applied in a similar way.

*Example 4*

1 part of Dyestuff 4 of the table, 1 part of the sodium salt of dinaphthylmethanedisulfonic acid and 8 parts of water are ground until a fine dispersion is obtained, which is run into a dyebath consisting of 3000 parts of water and 6 parts of Marseilles soap. 100 parts of a fabric of secondary cellulose acetate are entered into the dyebath, the temperature increased to 80° in 30 minutes and dyeing continued for 1 hour at this temperature. The dyed goods are removed, rinsed with water and dried. A bright greenish yellow dyeing is obtained which possesses good fastness to light, washing, perspiration and gas fumes.

Triacetate and synthetic polyamide fibers are dyed in a similar manner except that the dyeing temperature amounts to 95–100° instead of 80°.

The other Dyestuffs 1 to 3 and 5 to 47 of the table can be employed in a similar manner for the production of dyeings fast to light and wet treatments.

*Example 5*

A fabric of "Dacron" (registered trademark) polyester fiber is printed with a printing paste of the following composition:

17 parts of the Dyestuff 1 of the table,
48 parts of sodium dinaphthylmethanedisulfonate,
25 parts of butyl Carbitol,
500 parts of crystal gum 1:2,
30 parts of glycerine,
380 parts of water, 1000 parts.

The printed material, with or without intermediate drying, is developed by steaming at 1.5 to 1.7 atmospheres (112–118°), then rinsed, soaped, rinsed again and dried. The print is yellow in shade and possesses good fastness to light, washing, water, sea water, perspiration, gas fumes, sublimation and heat setting.

The prints on synthetic polyamide fibers and on cellulose esters can be produced in a similar manner but in the case of acetate it is preferable to steam the printed material at about 100–102°.

The other Dyestuffs 2 to 47 of the table also yield prints of similar fastness properties.

*Example 6*

A fabric of "Terylene" (registered trademark) polyester fiber is impregnated on the pad with a padding liquor of the following composition:

10 parts of the Dyestuff 10 of the table,
10 parts of sodium dinaphthylmethanedisulfonate,
5 parts of sodium alginate,
975 parts of water, 1000 parts.

The applied dyestuff can be fixed by the following methods:

(a) The padded fabric, with or without intermediate drying, is steamed for about 5–10 minutes at 120° and subsequently rinsed and dried.

(b) The padded fabric is conditioned for 3 hours at 95°–120° on the Pad-Roll dyeing machine, and then rinsed and dried.

(c) The padded fabric is dried and heated in dry heat at 200° for 2 minutes, after which it is washed, rinsed and dried.

The obtained yellow dyeings possess good fastness properties. The dyeings produced with the other dyestuffs of the table exhibit the same fastness properties.

Triacetate and synthetic polyamide fibers can be padded in the same manner, whereas for acetate the dyeing is preferably steamed at 100°–105°.

*Example 7*

40 parts of the Dyestuff 1 of the table, 20 parts of sodium sulforicinoleate and 40 parts of dextrin are ground in a ball mill for 48 hours.

1 part of the fine powder thus obtained is pasted with a little cold, soft water. Cold, soft water is poured on to the paste and the suspension is vigorously stirred and added through a sieve to a dyebath consisting of 1.5 parts of sodium lauryl sulfate in 3000 parts of water. 100 parts of a blended fabric of 55% Dacron polyester fiber and 45% wool are introduced at 40–50° into the dyebath which is then slowly heated to 95–100°, dyeing being continued at this temperature for 1 to 2 hours in presence of 20 parts of an aqueous emulsion of a chlorinated benzene. The dyed material is subsequently rinsed, soaped, rinsed again and dried. The Dacron is dyed to a yellow shade which is fast to light, washing, water, sea water, perspiration, gas fumes, cross-dyeing, sublimation and heat-setting, while the wool portion is reserved. The other Dyestuffs 2 to 47 of the table yield similar results.

*Example 8*

75 parts of the Dyestuff 6 of the table are dissolved in 2000 parts of boiling glacial acetic acid. The hot solution is filtered free from minor impurities, and the filtrate run rapidly with thorough stirring into 400 parts of water and 300 parts of ice. The suspension formed is filtered off. The filter residue is washed free from acetic acid and then kneaded with 125 parts of the dry residue of sulfite cellulose waste liquor, and the finely dispersed paste is dried at 30° in a water jet-vacuum. The product is carefully ground so as to prevent deterioration.

2 parts of the thus obtained dyeing preparation are pasted with a little cold, soft water; cold, soft water is poured into the paste, and the resulting suspension is stirred well and added through a sieve to a dyebath consisting of 2 parts of sodium lauryl sulfate and 4000 parts of water.

100 parts of a blended fabric of 65% Dacron polyester fiber and 35% of cotton are brought at 40–50° into the dyebath which is then slowly heated to 120–130°. Dyeing is continued at this temperature for about 30 minutes under static pressure. After rinsing, soaping, rinsing and drying a dyeing is obtained which is fast to light, washing, water, sea water, perspiration, gas fumes, cross-dyeing, sublimation and heat setting, while the cotton portion is reserved.

The other dyestuffs of the table show similar results.

The following examples are illustrative of the process for the preparation of the dyestuffs containing a 4-positioned urethane group.

*Example A*

22.5 parts of 1-amino-2-nitro-4-carbethoxyaminobenzene are diazotized in the normal way with 25 parts of 30% hydrochloric acid and 6.9 parts of sodium nitrite. At the same time 14.5 parts of 1.3-indandione are dissolved in 200 parts of water and 8 parts of a 30% sodium hydroxide solution so that the solution reacts alkaline; it is cooled to 0° and run into the diazo compound with the simultaneous addition of 25 parts of sodium carbonate as a 10% solution. On completion of coupling the precipitated deystuff is filtered off, washed with water and dried. It is obtained in the form of a yellow powder which dissolves in concentrated sulfuric acid with an orange coloration and, upon recrystallization from dimethylformamide, has its melting point at 236°.

*Example B*

The dyestuff described in Example 1 can also be obtained by boiling 21.4 parts of the sodium salt of 1.3-indandione-2-carboxylic acid ethyl ester in 300 parts of acetone and 30 parts of concentrated hydrochloric acid for a short time to give a yellow solution which is cooled to 10° and coupled with the diazo solution, prepared as described in Example 1. The precipitated dyestuff is filtered, washed and dried.

*Example C*

A diazo solution prepared according to Example 1 is coupled with a solution of the sodium salt of 5.6-dichloro-1.3-indandione-2-carboxylic acid ethyl ester prepared as described in Example 2. The dyestuff formed is similar to that of Example 1 but has a slightly redder shade. Upon re-crystallization from glacial acetic acid it melts at 250°.

*Example D*

31 parts of the aminomonoazo dyestuff of the formula

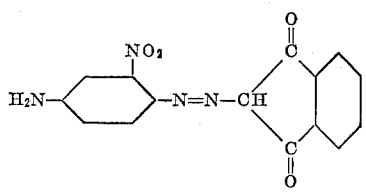

are dissolved in 150 parts of anhydrous pyridine. The solution is vigorously stirred whilst 11.5 parts of chloroformic acid ethyl ester are dropped into it in such a way as to prevent the temperature increasing to above 20°. Stirring is continued for 2 hours at room temperature, then the solution is heated to 70° and maintained at this temperature for 8 hours. On cooling to 20° it is run into 250 parts of water and 200 parts of ice. The dyestuff is precipitated by the addition of sufficient hydrochloric acid to convert it into a well filterable form. It is filtered, washed and dried. The dyestuff obtained is the Dyestuff No. 6 of the table.

Having thus disclosed the invention what we claim is:

1. Process for dyeing hydrophobic textile materials selected from the group consisting of secondary cellulose acetate, cellulose triacetate, synthetic polyamide fibers, and polyethylene terephthalate fibers, which comprises applying onto the said textile materials an aqueous suspension of the finely divided dyestuff of the formula

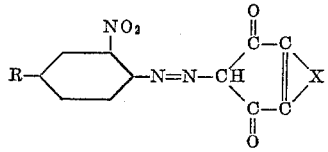

wherein

R represents a member selected from the group consisting of hydrogen, chlorine, nitro, amino, lower alkyl, lower alkanoylamino, lower carbalkoxyamino, lower carbo-(alkoxy)-alkoxyamino, lower carbo-(alkoxy-alkoxy)-alkoxyamino, carbo-(phenoxy)-lower alkoxyamino, carboaryloxyamino wherein aryl is of the benzene series, carbo-(phenyl lower alkoxy)-amino and carbo-cycloalkoxyamino and X represents a divalent radical selected from the group consisting of $$—CH=CH—CH=CH—$$
$$—CH=CCl—CH=CH—$$
$$—CH=CCl—CCl=CH—$$
$$—CH=CBr—CH=CH—$$
$$—CH=CBr—CBr=CH—$$

and $$—CH=C(NO_2)—CH=CH—$$

and completing the carbon-containing ring to form a six-membered ring.

2. Process according to claim 1, wherein the dyestuff of the formula

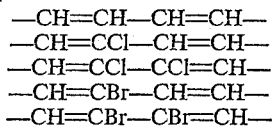

wherein X represents —CH=CH—CH=CH—, is used for dyeing the polyethylene terephthalate component of a blended fabric composed of wool and polyethylene terephthalate fibers.

3. Process according to claim 1, wherein the dyestuff of the formula

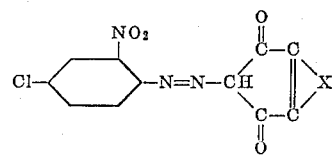

wherein X represents —CH=CH—CH=CH—, is used for dyeing the polyethylene terephthalate component of a blended fabric composed of cotton and polyethylene terephthalate fibers.

4. A process according to claim 1, wherein the dyeing is carried out at 100° C. in the presence of an aqueous emulsion of a chlorinated benzene.

5. A process according to claim 1, wherein the dyeing is carried out at 120–130° under pressure.

6. A member selected from the group consisting of secondary cellulose acetate, cellulose triacetate synthetic polyamide fibers, and polyethylene terephthalate fibers treated according to the process claimed in claim 1.

7. A process as described in claim 1, wherein said textile material is printed with said aqueous suspension.

8. A process as described in claim 1, wherein said textile material is padded with said aqueous suspension.

9. A process for dyeing the first member in a hydrophobic textile material which is a blend of a first member selected from the group consisting of secondary cellulose acetate, cellulose triacetate, synthetic polyamide fibers and polyethylene terephthalate fibers with a second member selected from the group consisting of wool, cotton and viscose rayon, while reserving the second member, which process comprises applying onto the said textile material an aqueous suspension of the finely divided dyestuff of the formula

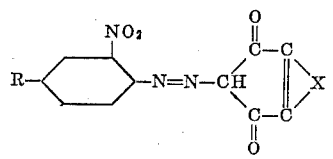

wherein R represents a member selected from the group consisting of hydrogen, chlorine, nitro, amino, lower alkyl, lower alkanoylamino, lower carbalkoxyamino, lower carbo-(alkoxy)-alkoxyamino, lower carbo-(alkoxy-alkoxy)-alkoxyamino, carbo-(phenoxy)-lower alkoxyamino, carbo-aryloxyamino wherein aryl is of the benzene series, carbo-(phenyl lower alkoxy)-amino and carbo-cycloalkoxyamino and X represents a divalent radical selected from the group consisting of

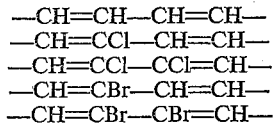

and

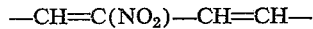

and completing the carbon-containing ring to form a six-membered ring.

10. A textile material which is a blend of a first member selected from the group consisting of secondary cellulose, acetate, cellulose, triacetate, synthetic polyamide fibers and polyethylene terephthalate fibers with a second member selected from the group consisting of wool, cotton and viscose rayon, wherein said first member has been dyed according to the process claimed in claim 9, while said second member has been reserved.

11. A process for dyeing the polyethylene terephthalate component of a blended fabric composed of wool and polyethylene terephthalate fibers, which comprises applying to the fabric an aqueous suspension of the finely divided dyestuff of the formula

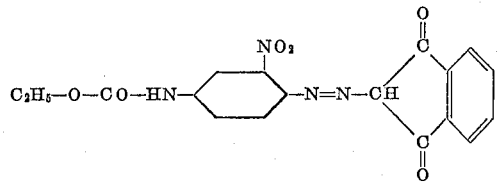

12. A process for dyeing the polyethylene terephthalate component of cotton and polyethylene terephthalate fibers, which comprises applying to the fabric an aqueous suspension of the finely divided dyestuff of the formula

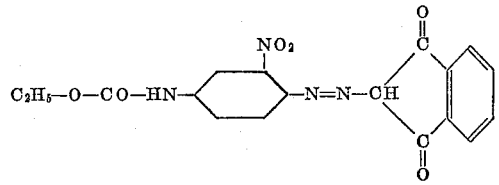

References Cited in the file of this patent

UNITED STATES PATENTS

| | | |
|---|---|---|
| 1,075,305 | Schmidt | Oct. 7, 1913 |
| 2,028,141 | Ackermann | July 21, 1936 |
| 2,881,045 | Mecco | Apr. 7, 1959 |